(No Model.)

E. H. SMITH.
DITCHING MACHINE.

No. 297,861. Patented Apr. 29, 1884.

WITNESSES:
Donn Twitchell
C. Sedgwick

INVENTOR:
E. H. Smith
BY Munn & Co
ATTORNEYS.

UNITED STATES PATENT OFFICE.

ELMER H. SMITH, OF QUINTON, NEW JERSEY.

DITCHING-MACHINE.

SPECIFICATION forming part of Letters Patent No. 297,861, dated April 29, 1884.

Application filed November 14, 1883. (No model.)

*To all whom it may concern:*

Be it known that I, ELMER H. SMITH, of Quinton, in the county of Salem and State of New Jersey, have invented a new and Improved Ditching-Machine, of which the following is a full, clear, and exact description.

My invention relates to improvements in ditching-machines; and it consists in the peculiar construction and arrangement of parts, as hereinafter fully described, and pointed out in the claims.

Reference is to be had to the accompanying drawings, forming part of this specification, in which similar letters of reference indicate corresponding parts in both the figures.

Figure 1:
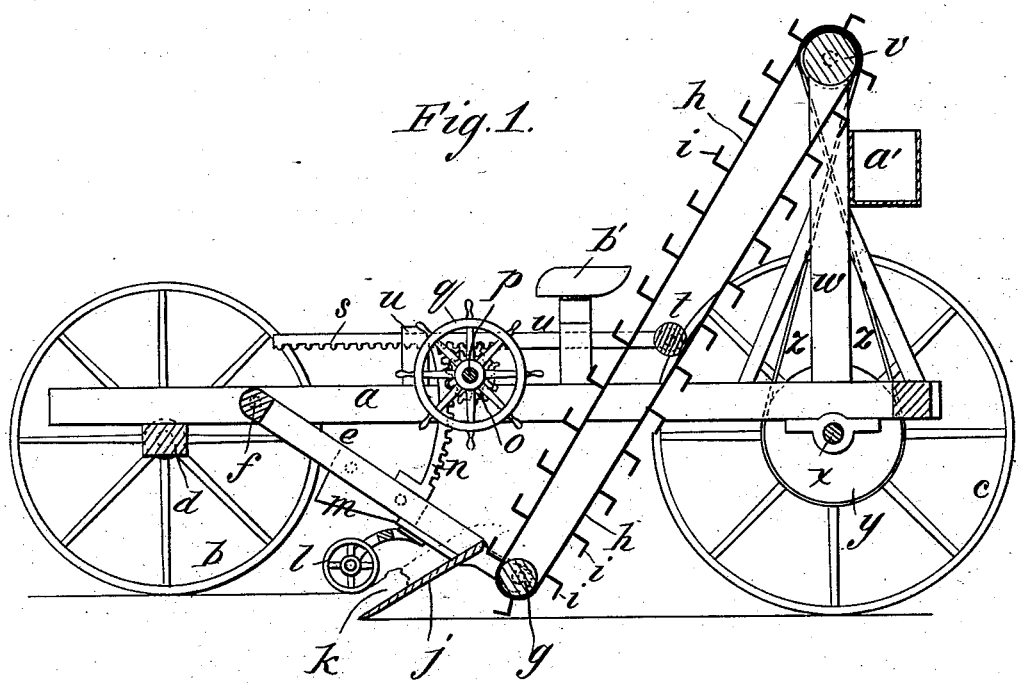
Figure 2:
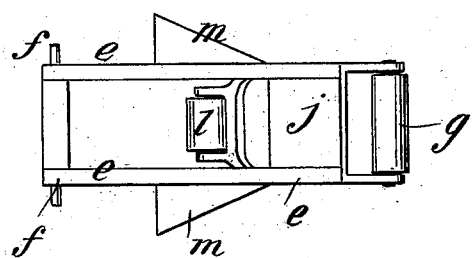

Figure 1 is a longitudinal sectional elevation of my improved ditching-machine, and Fig. 2 is a detail of the plow-frame with attachments for widening the ditch by sloping the banks.

On any suitable truck-frame, $a$, carried by four wheels, $b$ $c$, and a little back of the front axle, $d$, I suspend a frame, $e$, by pivots $f$, so as to swing up and down at the rear end of said frame, wherein a roller, $g$, is mounted for the lower bight of an endless elevator-belt, $h$, having buckets $i$ to run under and directly in front of the elevator-roller. The plow, consisting of an inclined flat plate, $j$, is attached to said frame suitably for cutting a slice of earth, $k$, and delivering it over the upper end of said plow into the buckets of the elevator. A little in advance of the plow a gage-roller, $l$, is attached to the frame, to run along the surface of the ground and gage the depth of the plow therein, and above the gage-roller $l$ the flaring wing-blades $m$ are attached to the frame $e$, suitably for trimming down the side walls of the ditch and sloping them to the required form. This frame $e$ is connected by the curved toothed bars $n$ with toothed pinions $o$ on a shaft, $p$, mounted on the truck-frame $a$, and provided with a hand-wheel, $q$, for turning said shaft, to raise and lower the plow and elevator, as required, in the progress of the work. The shaft $p$ also gears with toothed bars $s$, which connect with a belt-tightener, $t$, working against the slack side of the belt, so as to push it backward and take up the slack when the plow and lower roller, $g$, rise, and to withdraw therefrom to let the belt extend downward when the plow is lowered. The bars $s$ are supported in the standards $u$, in which they are fitted to slide freely in adjusting the belt. The roller $t$ has its pivot-bearings in these bars $s$, of which there will be one on each side of the frame $a$ and the belt $h$. The upper roller, $v$, over which the elevator runs, is mounted in the standards $w$, extending up from the frame $a$ over the hind axle, $x$, and said roller is geared with a pulley, $y$, on said axle $x$ by a crossed belt, $z$, for driving the elevator. The truck-wheels $c$ are keyed to the axle $x$ for turning it to drive the elevator. The elevator-buckets $i$ empty into the chute $a'$, which delivers the earth raised out of the ditch on the ground at the side of the ditch.

Between the elevator and the shaft $p$, for adjusting the plow, the driver's seat $b'$ is located, where the driver can work the wheel $q$ readily for raising and lowering the plow as the progress of the work demands.

It will be seen that by the improved plow-shifting and elevator-belt-tightening apparatus I have the benefit of a simple endless elevator, that is capable of shifting up and down with the plow, and at the same time being always in proper tension without the cumbersome contrivances for shifting both elevator-rollers, as is necessary without the tightening device, and by the contrivance I have made for shifting both the plow and lower roller-frame and the belt-tightener by the one hand-wheel the machine is made very simple and convenient.

I am aware that a frame carrying at its lower end a roller around which an elevator passes has been pivoted to the forward part of the frame and raised and lowered by a chain or rope on a windlass, the plow-standards being attached to pivoted frame, so that the plows will be raised with the said frame, and I therefore do not claim such invention.

Having thus fully described my invention, I claim as new and desire to secure by Letters Patent—

1. The frame $e$, suspended from the truck-frame by pivots $f$, toothed bars $n$, pinions $o$, and regulating-shaft $p$, and having plow $j$ and lower elevator-roller $g$, in combination with the endless elevator arranged on driving-drum $v$, and having tightener $t$, mounted in sliding toothed bars *s*, gearing with said regulating-shaft *p*, substantially as described.

2. The gage-wheel *l*, in combination with vertically-adjusting frame *e*, plow *j*, roller *g*, and endless elevator *h i*, substantially as described.

3. The gage-wheel *l*, in combination with frame *e*, pivoted to frame *a*, and geared with the regulating-shaft *p* by pinions *o* and toothed bars *n*, said frame having plow *j*, and being arranged with the elevator *h i*, substantially as described.

4. The combination of the flaring ditch-widening plates *m*, with the frame *e*, plow *j*, and the elevator *h i*, substantially as described.

ELMER H. SMITH.

Witnesses:
L. L. SINNICKSON,
JOHN G. LINDZEY.